United States Patent [19]
Fisher

[11] Patent Number: 5,311,092
[45] Date of Patent: May 10, 1994

[54] LIGHTWEIGHT HIGH POWER ELECTROMAGNETIC TRANSDUCER

[75] Inventor: Gene A. Fisher, Highlands Ranch, Colo.

[73] Assignee: Unique Mobility, Inc., Englewood, Colo.

[21] Appl. No.: 596,371

[22] Filed: Oct. 12, 1990

Related U.S. Application Data

[63] Continuation of Ser. No. 125,781, Nov. 27, 1987, Pat. No. 5,004,944, which is a continuation of Ser. No. 812,306, Dec. 23, 1985, abandoned.

[51] Int. Cl.$^5$ .............................................. H02K 1/22
[52] U.S. Cl. ................... 310/266; 310/44; 310/179; 310/198
[58] Field of Search ............ 310/266, 44, 43, 45, 310/156, 198, 207, 180, 181, 216, 184, 218, 67 R, 64, 46, 65, 177, 115, 261, 185, 188, 195, 232, 233, 248, 52, 62, 63, 179

[56] References Cited

U.S. PATENT DOCUMENTS

| | | |
|---|---|---|
| 295,368 | 3/1884 | Dennis . |
| 497,001 | 5/1893 | Crompton . |
| 1,227,185 | 5/1917 | Neuland . |
| 3,014,139 | 12/1961 | Shilneck . |
| 3,102,964 | 9/1963 | Bennett et al. . |
| 3,128,402 | 4/1964 | Amick, Jr. . |
| 3,134,037 | 5/1964 | Upton . |
| 3,275,863 | 9/1966 | Fodor . |
| 3,312,846 | 4/1967 | Henry-Baudot . |
| 3,538,364 | 11/1970 | Favereau . |
| 3,602,749 | 8/1971 | Esters . |
| 3,663,850 | 5/1972 | Phelon . |
| 3,729,642 | 4/1973 | Esters . |
| 3,845,338 | 10/1974 | Fawzy . |
| 3,858,071 | 12/1974 | Griffing et al. . |
| 4,015,154 | 3/1977 | Tanaka ................... 310/42 |
| 4,114,057 | 9/1978 | Esters . |
| 4,128,364 | 12/1978 | Papst et al. . |
| 4,255,494 | 3/1981 | Reen ................... 310/244 |
| 4,321,496 | 3/1982 | Hickey . |
| 4,447,947 | 5/1984 | McCarty ................... 310/64 |
| 4,451,749 | 5/1984 | Kanayama et al. . |
| 4,517,484 | 5/1985 | Dacier ................... 310/266 |
| 4,719,377 | 1/1988 | Horie et al. ............ 310/44 |
| 4,948,999 | 8/1990 | Bertram et al. ........ 310/44 |
| 5,004,944 | 4/1991 | Fisher ................... 310/266 |

FOREIGN PATENT DOCUMENTS

| | | |
|---|---|---|
| 1029788 | 4/1978 | Canada . |
| 843866 | 7/1952 | Fed. Rep. of Germany . |
| 1463833 | 9/1969 | Fed. Rep. of Germany ........ 310/43 MX |
| 94938 | 7/1981 | Japan . |
| 62742 | 4/1982 | Japan . |
| 0009557 | 3/1894 | United Kingdom . |

*Primary Examiner*—R. Skudy
*Attorney, Agent, or Firm*—Stevens, Davis, Miller & Mosher

[57] ABSTRACT

An electromagnetic transducer is disclosed that is lightweight and has a high power to weight ratio, with the transducer being capable of operation as an efficient motor, alternator or generator, and being particularly useful, for example, in connection with self-propelled vehicle applications such as passenger cars. The electromagnetic transducer can utilize a shell construction, which enhances heat removal, and includes a magnetic-flux producing assembly, having a plurality of spaced magnetic elements, and an armature assembly formed by a winding arrangement of dispersed conductive elements which are separated by flux carrying elements which, to the extent that such flux carrying elements are electrically conductive, are dispersed in one, two or three dimensions to thus be dispersed-phase flux carrying elements. The armature conductors and flux carrying elements are dispersed to minimize creation of opposing induced current, or eddy currents, depending on the effect produced on transducer operation. This dispersal enables operation of the transducer at high efficiency with high torque being maintained even during high speed relative motion between the magnetic flux producing assembly and the armature with the combination of high torque and high speed producing higher power per unit weight than can now known devices.

5 Claims, 6 Drawing Sheets

Fig_2

Fig_6          Fig_7

Fig_8

Fig_9

Fig_10

Fig_4

Fig_5

Fig_11

Fig_12

Fig_13

Fig_14

Fig_15

Fig_19

Fig_20

Fig-17

LIGHTWEIGHT HIGH POWER ELECTROMAGNETIC TRANSDUCER

This is a continuation of application Ser. No. 125,781 filed Nov. 27, 1987 U.S. Pat. No. 5,004,944 which in turn is a continuation of Ser. No. 812,306, filed Dec. 23, 1985 now abandoned.

FIELD OF THE INVENTION

This invention relates to an electromagnetic transducer, and, more particularly relates to a lightweight high power electromagnetic transducer capable of use as a motor, alternator or generator.

BACKGROUND OF THE INVENTION

Electromagnetic transducers are known for use both in transforming electrical power into mechanical power and transforming mechanical power into electrical power. In both cases, power producing capability results due to relative movement between magnetic elements and electrically conductive elements, as is well known, for example, in the application of this phenomenon to motors, alternators and generators.

While it is well known that motor, alternator and generator devices can be made that are quite light in weight, and while at least some known lightweight devices have been capable of operation at high speeds, such devices have not been capable of operation at high speeds to produce high power. For example, high power density devices of 0.6 horsepower per pound of weight are known for intermittent operation, but such devices are incapable of continuous operation at high power densities in excess of 1.0 horsepower per pound.

Known electromagnetic transducer devices have also not been capable of simultaneous high speed and high torque operation and/or have not provided adequate efficiency in operation. In addition, prior shell construction devices have not used both dispersed conductors and dispersed phase flux carrying means in the armature and have, therefore, also been limited to low speed, which, even at high torque, leads to low power density.

It is also well known that an electromagnetic transducer can include a stator and rotor arrangement, and that such an arrangement can include positioning magnetic elements on the rotor (see, for example, U.S. Pat. Nos. 3,663,850, 3,858,071, and 4,451,749), as well as on the stator (see, for example, U.S. Pat. Nos. 3,102,964, 3,312,846, 3,602,749, 3,729,642 and 4,114,057). It has also been heretofore suggested that a double set of polar pieces could be utilized (see, for example, U.S. Pat. No. 4,517,484).

In addition, a shell type rotor has been heretofore suggested (see, for example, U.S. Pat. Nos. 295,368, 3,845,338 and 4,398,167), and a double shell rotor arrangement has also been suggested (see, for example, U.S. Pat. No. 3,134,037).

It has also been heretofore suggested that a bundle of wires can be utilized in place of a single conductor in the armature assembly of a motor (see, for example, U.S. Pat. Nos. 497,001, 1,227,185, 3,014,139, 3,128,402, 3,538,364 and 4,321,494, as well as British Patent No. 9,557) with such wires being stated to be for high voltage and high current usage and/or to reduce current flow loss, the so-called skin effect, and heating due to eddy currents, and with such wires being utilized in conjunction with solid and/or laminated cores (see, for example, U.S. Pat. Nos. 3,014,139, 3,128,402, and British Patent No. 9,557).

It has also been heretofore suggested than an electromagnetic transducer could have a power to weight ratio of up to about one horsepower to one pound (see, for example, U.S. Pat. No. 3,275,683). In addition, cooling of a motor, to increase power handling capability, using a gas, liquid, or a mixture of a gas and liquid, is well known (see, for example, U.S. Pat. No. 4,128,364).

While various arrangements for electromagnetic transducers have therefore been heretofore suggested and/or utilized, such transducers have not been found to be completely successful for at least some uses, including providing a lightweight transducer that is capable of providing high power.

In particular, the prior art does not teach the necessity to disperse the conductors to enable high speed operation, due, at least in part, to a widely taught theory that the magnetic field is very low in the conductors. With conductors built according to conventional teachings, however, it has been found that torque, at constant current, decreases with increasing speed, which result is contrary to the conventional expectation that torque would remain high as speed increases (which is the result achieved by this invention).

SUMMARY OF THE INVENTION

This invention provides an improved electromagnetic transducer that is lightweight and yet provides high power conversion due to the high power density capability of the transducer, with the transducer being capable of operation as a highly efficient motor, alternator or generator, with the transducer of this invention being capable or continuous operation at high power densities in excess of 1.0 horsepower per pound.

High power density per unit weight is effected by utilization of an armature assembly having dispersed conductors which are separated by dispersed-phase flux carrying elements in a manner such that low opposing induced currents are created, as well as low eddy currents, to enable operation of the transducer at high efficiency with high torque being maintainable during high speed operation.

As the armature moves relative to a magnetic flux producing assembly, currents (which are often referred to as eddy currents) are established in the electrically conductive portions of the armature and these currents lead to heating and skin effects (which are collectively known as eddy current losses). However, these currents also produce another effect not heretofore realized, which currents are herein referred to as opposing induced currents since these currents alter the magnetic flux pattern and act to reduce the torque with speed increase. This power conversion capability reduction with speed increase can occur even when the losses due to these currents are acceptable, and conventional practice would not suggest dispersing the conductors as has been done in the electromagnetic transducer of this invention.

It is therefore an object of this invention to provide an improved electromagnetic transducer.

It is another object of this invention to provide an improved electromagnetic transducer that is lightweight and yet provides high power so that the transducer has high power density.

It is still another object of this invention to provide an improved electromagnetic transducer that operates at high efficiency.

It is still another object of this invention to provide an improved electromagnetic transducer having high power density per unit weight capability.

It is still another object of this invention to provide an improved electromagnetic transducer having a high power to weight ratio.

It is still another object of this invention to provide an improved electromagnetic transducer capable of use as a highly efficient motor, alternator or generator.

It is still another object of this invention to provide an improved electromagnetic transducer that is capable of continuous operation at high power densities in excess of one horsepower per pound.

It is still another object of this invention to provide an improved electromagnetic transducer having an armature assembly with dispersed conductors different sections of which have flux carrying elements positioned therebetween with the conductors and flux carrying elements being formed and positioned in a manner so as to create low opposing induced currents.

It is still another object of this invention to provide an improved electromagnetic transducer having an optimum thickness armature assembly which represents a balance among the effects of heat transfer to the cooling medium, heat production from resistance heating and other sources, and torque production.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 19 is a graph illustrating the relationship between torque and speed for a conventional transducer b and for the transducer of this invention a.

DESCRIPTION OF THE INVENTION

A novel electromagnetic transducer is particularly described herein, including alternate embodiments thereof. It is meant to be realized that the electromagnetic transducer of this invention may be utilized as a motor (ac or dc), alternator or generator, depending on whether an electrical signal is conveyed to the armature (commonly through a commutator or equivalent structure), to create a force causing movement of the magnetic flux producing structure relative to the armature thus driving the shaft, or whether the shaft is rotated to thereby cause movement of the magnetic flux producing structure relative to the armature to create an electromotive force which, in turn, can cause movement of current along the conductors of the armature to be coupled from the conductors as an electrical signal, as is well known.

Figures 1, 3:
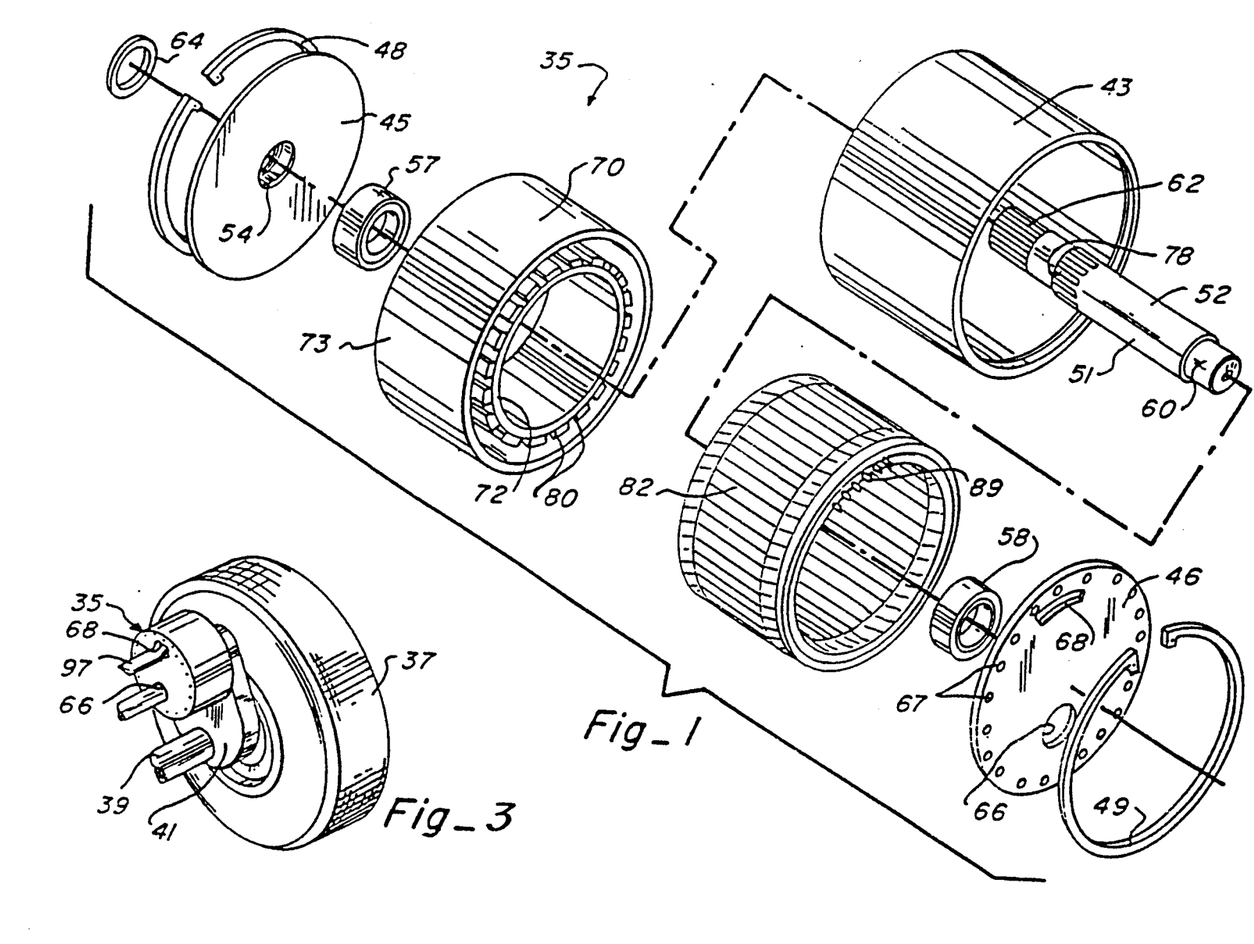
FIG. 1 is an exploded isometric view of a rotary implementation of the electromagnetic transducer of this invention.
FIG. 3 is a partial isometric view illustrating use of the electromagnetic transducer of this device configured as a traction motor to drive a wheel of an associated vehicle.
Figures 2, 6, 7:
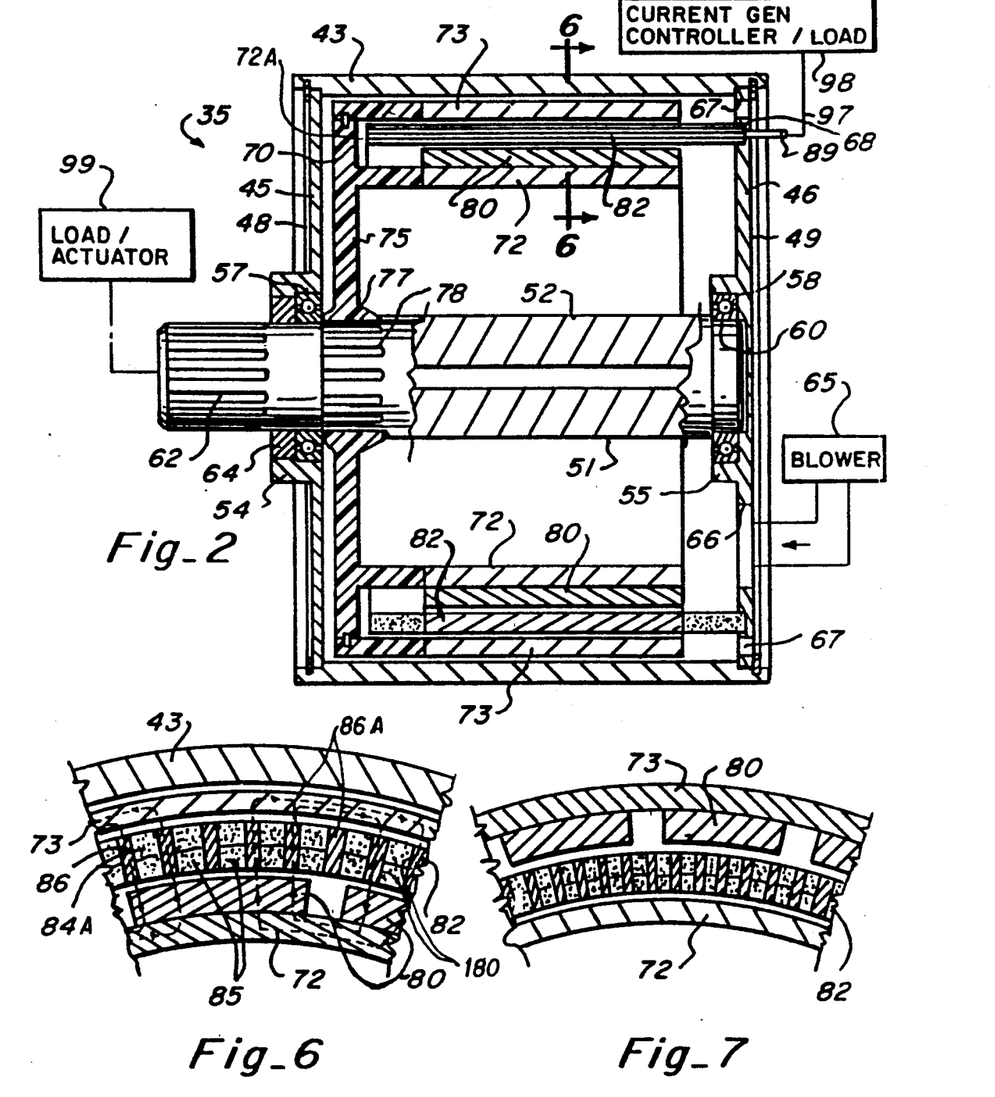
FIG. 2 is a side sectional view of the assembled electromagnetic transducer as shown in FIG. 1, along with additional elements illustrated in block form to better illustrate the invention.
FIG. 6 is a sectional view taken through lines 6—6 of FIG. 2, with the magnetic flux path in the transducer also being illustrated.
FIG. 7 is a partially cut-away view similar to that of FIG. 6 but illustrating an alternate embodiment of the electromagnetic transducer of this invention.

Electromagnetic transducer 35, as best shown in FIGS. 1 and 2, is lightweight and yet is capable of delivering high power, with the transducer being a high power density device that is particularly well suited, for example, for use in conjunction with self-propelled vehicle applications, such as passenger cars, although the invention is not meant to be restricted thereto.

When used for vehicle propulsion, a permanent magnet, hollow cylinder electromagnetic transducer 35 may be utilized as an efficient wheel mounted traction motor, and may, as indicated in FIG. 3, be mounted directly at each wheel 37, adjacent to axle 39, with drive being preferably achieved through gear reduction mechanism 41.

As shown in FIGS. 1 and 2, electromagnetic transducer 35 includes an outer cylindrical housing 43, which housing has front and rear end plates 45 and 46 positioned at the opposite ends of the cylindrical housing by means of snap rings 48 and 49.

A shaft 51 has a central portion 52 extending through the cylindrical housing with the shaft being mounted in central hubs 54 and 55 of end plates 45 and 46, respectively, by means of bearings 57 and 58 so that the central portion of the shaft is coaxially positioned with respect to the cylindrical housing, the reduced diameter rear portion 60 of the shaft is mounted in bearing 58, and the front portion 62 of the shaft extends forwardly of front end plate 45, with seal 64 being positioned in hub 54 adjacent to bearing 57.

As also shown in FIG. 2, blower 65 is positioned adjacent to back, or rear, end plate 46, which plate includes offset air intake aperture 66 and a plurality of exhaust apertures 67 spaced about and near the periphery of the end plate. When so used, the transducer thus operates in a gas (air) medium (as opposed to a fluid medium which could include oil or the like, for example, as do some known transducers). In addition, an arcuate aperture 68 is positioned to allow armature conductor connections through end plate 46.

As best shown in FIG. 2, rotor 70 has a double shell configuration provided by inner and outer spaced cylindrical portions 72 and 73 which extend normally from mounting disk 75 so that cylindrical portions 72 and 73 are coaxial with, and inside, cylindrical housing 43 and define an annular gap 72A therebetween. Mounting disk 75 has an annular mounting portion 77 which is received on splined portion 78 of shaft 51 inwardly of bearing 57.

Inner cylindrical portion 72 of rotor 70 has magnetic elements 80 mounted thereon, which magnetic elements are shown to be permanent magnets (but electromagnets could be utilized, if desired). Inner and outer walls 72 and 73, respectively, are formed of highly magnetically permeable with low hysteresis loss magnetic material (such as iron or steel, for example), and mounting disk 75 is formed of non-magnetic material (such as plastic or aluminum, for example), while magnetic elements 80 are high strength permanent magnets, which magnets are preferably formed of neodymium boron ferrite (NdFeB), but may also be formed of barium ferrite ceramic (BaFe Ceramic), samarium cobalt (SmCo), or the like.

Armature 82 comprises an annular member at least partially disposed within gap 72A and is fixed with respect to housing 43, and is mounted on rear end plate 46, as indicated in FIG. 2, so that rotor 70 rotates relative to armature 82 (as well as to housing 43). Armature 82 is thus a stationary cylindrical shell element that extends through the length of cylindrical housing 43 between the inner and outer cylindrical walls 72 and 73 of the rotor.

Figure 4:
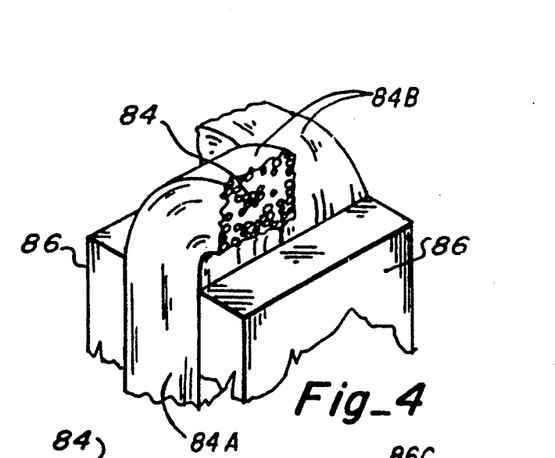
FIG. 4 is a partial isometric view showing the arrangement of the dispersed conductors and flux carrying elements of the electromagnetic transducer shown in FIGS. 1 and 2.
Figure 5:
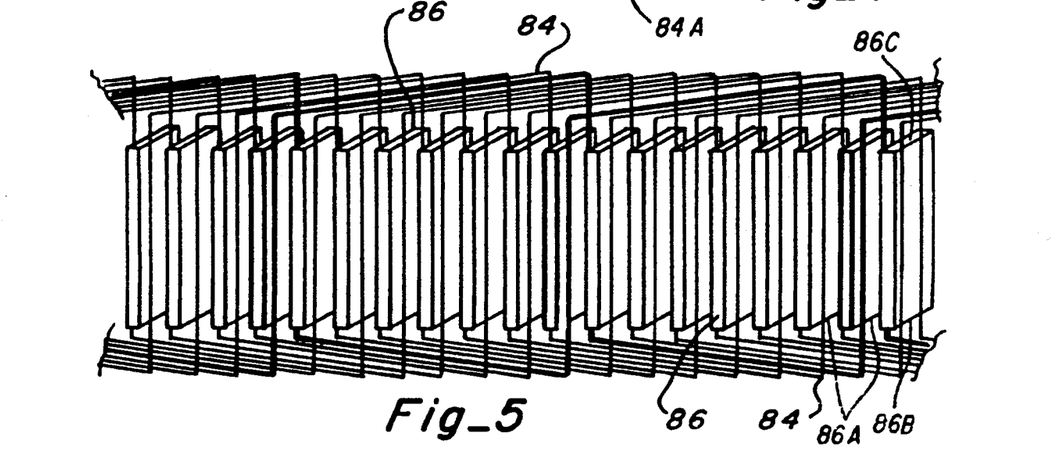
FIG. 5 is a diagram illustrating a typical arrangement of a two layer winding formed by the dispersed conductors and illustrating the flux carrying elements positioned between turns of the windings.
Figure 11:
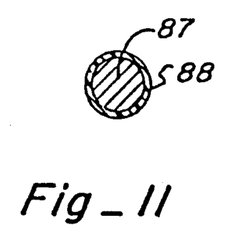
FIG. 11 is a partial end view illustrating a dispersed conductor, as best shown in FIG. 4, and illustrating the insulation layer around the conductor.

It is important to this invention that armature 82 include dispersed conductors 84, as best shown in FIG. 4, different sections 85 of which are positioned between flux carrying elements 80 as best shown in FIG. 6. The conductors 84 have discrete, spaced apart active regions 84A, as shown in FIGS. 4 and 5. As shown in FIG. 6, active regions 84A have a substantially rectangular cross-section. Between active regions 84A are a plurality of discrete elongated open space areas 86A (see FIGS. 5 and 6). A flux carrying means formed of a plurality of flux carrying members 86 of compressed iron powder are interposed in open space areas 86A between active regions 84A. Dispersed conductors 84 are preferably formed from a bundle of small diameter copper wires 87 surrounded by insulating material 88 (as best shown in FIG. 11), with conductors 84 being wound into a linking pattern, as indicated by way of example in FIG. 5, with the opposite ends of the wire bundles being connected to connectors 89 extending through aperture 68 in end plate 46, as indicated in FIG. 2.

conductors 84, as best shown in FIG. 4, are formed into a bundle throughout the armature (as by being wound in a ring, for example), and each turn of the wire windings has a flux carrying element 86 therebetween, as shown in FIGS. 5 and 6, with a typical winding which constitutes a structurally integral annular winding structure, being conceptually illustrated in FIG. 5.

Flux carrying elements 86 are preferably iron (at least in part), and extend between the active region or length 84A of conductors 84. Elements 86 have radially inner 86B and radially outer 86C elongated edges (see FIG. 5). Conductors 84 also have flat end turns 84B at which the winding conductors 84 are reversed in direction (see FIGS. 4 and 5) that extend beyond the active lengths 84A to connect the active lengths to each other in an appropriate pattern, such as a wave winding as shown, by way of example, in FIG. 5. The flux carrying elements 86 are preferably dispersed-phase flux carrying members to handle the high frequency magnetic field reversals with low opposing induced currents and low eddy current losses. Because iron is electrically conductive, it must be dispersed to avoid (or at least minimize) the creation of opposing induced currents. It has been found that a suitable flux carrying element 86 can be pressed from fine (10–100 m kron) iron powder previously reactively coated with phosphate insulation and using "B" stage epoxy and wax as binders.

By providing conductors comprising a plurality of small diameter wires with dispersed-phase flux carrying elements between turns of the wires, opposing induced currents are minimized sufficiently so as to allow operation of the electromagnetic transducer at high speeds and at high torque with such operation being conductable at high efficiency. In a working embodiment, a stationary armature shell incorporating windings of copper with powdered iron bars to carry the magnetic flux, and permeated with glass re-enforced novolac epoxy insulation material cast as a bonding agent 180 between the windings and bars, has been successfully utilized.

Figure 19:
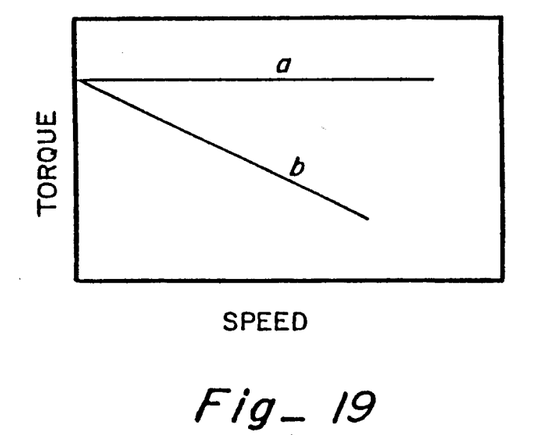

In this invention when used as a motor, at constant current, it has been found that the torque output can be maintained nearly constant even with increases in rotor speed, as illustrated in FIG. 19 by line a. This is quite unlike prior art devices wherein torque was found to drop off rapidly with increased speed when solid bars were utilized as conductors and as flux carrying elements, as illustrated in FIG. 19 by line b. The combination of high torque and high speed, made possible in the electromagnetic transducer of this invention, produces high power density.

As shown in FIG. 6, armature 82 (formed by the dispersed conductors 84 and flux carrying members 86) are closely spaced with respect to magnets 80 positioned about the inner cylindrical wall 72, and also closely spaced with respect to cylindrical wall 73, with walls 72 and 73 providing inner and outer return paths, respectively, for the magnetic flux. Some typical flux paths have been illustrated in FIG. 6. As shown, these flux paths are loops each of which penetrates the armature twice passing principally through the flux carrying members 86. The flux carrying members thus allow a thick armature to maintain a high flux density which is essential to high torque.

Figure 8:
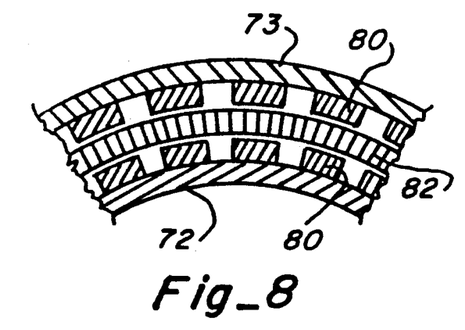
FIG. 8 is a partially cut-away view similar to that of FIG. 6 but illustrating another alternate embodiment of the electromagnetic transducer of this invention.

As indicated in FIG. 7, the electromagnetic transducer may also be configured by placing magnets 80 on outer wall 73 (rather than on inner wall 72). As indicated in FIG. 8, the electromagnetic transducer may also be configured by placing magnets 80 on both inner and outer walls 72 and 73.

Figure 9:
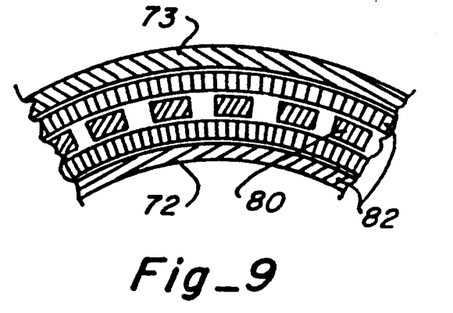
FIG. 9 is a partial cut-away view similar to that of FIG. 6 but illustrating still another alternate embodiment of the electromagnetic transducer of this invention.
Figure 10:
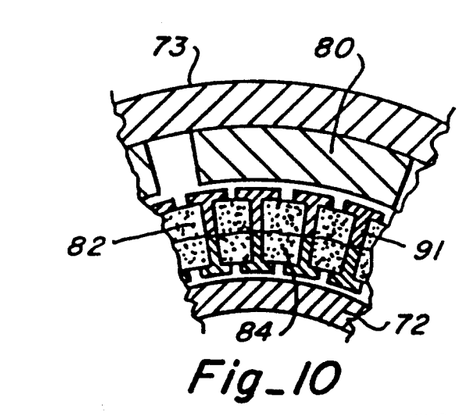
FIG. 10 is a partial cut-away view similar to that of FIG. 6 but illustrating yet another alternate embodiment of the electromagnetic transducer of this invention.

As indicated in FIG. 9, an armature 82 can also be provided at both sides of magnets 80. In addition, while not specifically shown, it is also to be realized that the electromagnetic transducer could be configured by placing additional layers of armature-rotor elements radially inwardly and/or outwardly of that shown in the drawings. While flux carrying members 86 in the above embodiment are rectangular in cross-section, the flux carrying members may also be configured by utilizing a non-rectangularly shaped member such as, for example, an l-shaped member 91 (as indicated in FIG. 10) having dispersed conductors 84 extending therebetween.

Figure 12:
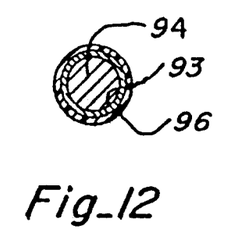
FIG. 12 is an end view similar to that of FIG. 11 but illustrating an alternate embodiment of the armature structure wherein the conductors have a coating of a flux carrying means (iron) thereon utilizable in lieu of the flux carrying elements as illustrated in FIGS. 4 through 10.
Figure 13:
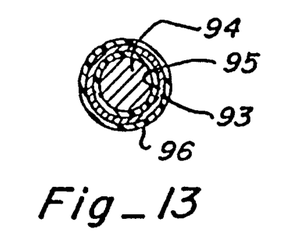
FIG. 13 is an end view similar to that of FIGS. 11 and 12 but illustrating another alternate embodiment of the armature structure wherein insulated conductors have a coating of a flux carrying means (iron) thereon utilizable in lieu of the flux carrying elements as illustrated in FIGS. 4 through 10.

The armature can also be configured as shown in FIG. 12 such that flux carrying elements 93 are formed as a coating of highly permeable magnetic material (such as iron) on some or all of the dispersed conductors 94. As indicated in FIG. 13, conductors 94 can also have an insulation layer 95 thereon so that insulation layer 95 is between the conductor and the flux carrying element. In either case, an insulating layer 96 covers the flux carrying element (unless it is, of itself, electrically non-conductive).

Figure 14:
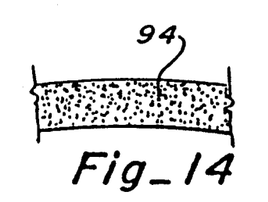
FIG. 14 is a partial view illustrating the use of the embodiment of either FIG. 12 or FIG. 13 as the armature without use of separate flux carrying elements.
Figure 15:
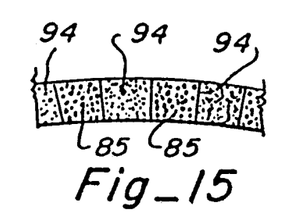
FIG. 15 is a partial view similar to that of FIG. 14 but illustrating use of alternating sections of dispersed conductors and dispersed conductors coated as shown in the embodiment of FIG. 12 or FIG. 13.

When the flux carrying elements are formed as coatings on the dispersed conductors (as indicated in FIGS. 12 and 13), the flux carrying bars (shown in FIGS. 4 through 10) need not be utilized. The dispersed conductors 94 with the flux carrying elements coated thereon can be utilized as the only elements of the armature (as indicated in FIG. 14) or can be alternated with dispersed conductor sections 85, i.e., dispersed conductors having no flux carrying element coating thereon (as indicated in FIG. 15).

Powdered iron utilized as flux carrying elements 86 (as indicated in FIG. 6) provide three-dimensional phase dispersion, while flux carrying elements 93 coated on the dispersed conductors (as indicated in FIGS. 12 and 13) provide two-dimensional phase dispersion (iron lamination bars, on the other hand, when used as flux carrying elements provide only one-dimensional phase dispersion).

The electromagnetic transducer of this invention thus includes a magnetic flux producing assembly (having at least one pair of poles which can be embodied by using permanent magnets or electromagnets), and an armature assembly (which intercepts the magnetic flux produced by the magnetic flux producing assembly and has an alternating structure of conductive windings and flux carrying elements, which flux carrying elements can be referred to as armature iron). A winding can be used as the principal component of the armature with the winding consisting of bundles of separate conductors (which are referred to herein as dispersed conductors), with the use of dispersed conductors of fine wire permitting high speed rotation of the rotor when used in conjunction with dispersed-phase flux carrying elements.

The use of multiple, parallel extending, insulated conductors to reduce heating losses at high currents has been heretofore suggested (see, for example, U.S. Pat. No. 497,001), and it is well known in the motor art as a method to reduce skin effect losses in motors. Skin effect, however, causes losses at load only, whereas eddy current losses, which would be experienced when known devices are rotated at high speed, occur at no load. This distinction is as to the mechanism of the effect.

In the case of conductors of large cross section of conductive flux carrying elements of large cross section, as used at least in some prior known devices, as the frequency of the magnetic field reversal increases, the magnitude of the induced currents in the bars increases, and the induced currents react with the magnetic field to create a resisting torque which opposes the increase of rotational speed. Thus, known shell type devices are inherently limited to low speed by the reaction torque, and cannot be rotated at high speed and are therefore unlike the device of the present invention, not suitable, for example, for use as traction motors in most practical applications.

When used as a motor, a means to displace (i.e., rotate) the magnetic field relative to the armature at high speed must, of course, also be provided so that electric power can be converted into mechanical power in a manner similar to that used by known motors. As indicated in FIG. 2, this can be accomplished by connecting leads 97 between connectors 89 of armature 82 and current generator and controller unit 98 so that unit 98 which provides current to conductors (see FIG. 10) to cause rotation of rotor 70, with rotation of rotor 70 causing rotation of shaft 51 to drive a load/actuator 99.

When used as an alternator or generator, load/actuator 99 causes rotation of shaft 51 which rotates rotor 70 to induce a voltage on conductors 84 and thereby generates electrical current flow from conductors 84 to a load 98. While not specifically shown in FIGS. 1 through 15, it is to be realized that the current generator and controller unit (or alternately the armature; includes necessary electric commutation devices, including those devices wherein commutation is performed electronically (as in a brushless DC motor, for example), as well as those devices which employ rectifiers instead of commutation (as is often used in power generating applications).

Figure 16:
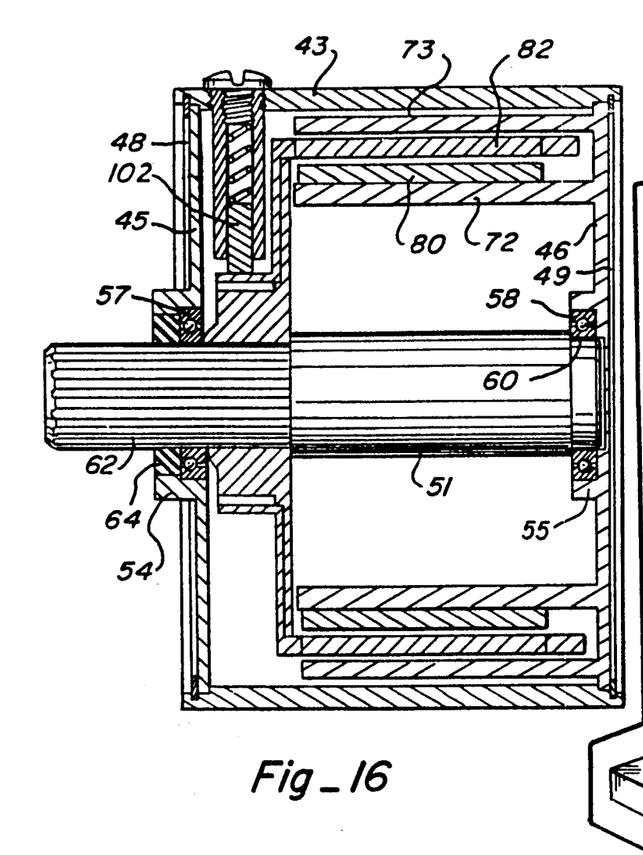
FIG. 16 is a side sectional view of an alternate embodiment of the electromagnetic transducer as shown in FIG. 2, and illustrates the armature fixed to the shaft as may be convenient to a brush commutated transducer.

FIG. 16 illustrates an embodiment of the electromagnetic transducer of this invention in which armature 82 is connected with shaft 51, and inner and outer cylindrical walls 72 and 73 are fixed to housing 43. In this embodiment, the armature thus becomes the rotor with electric power being communicated with the armature by means of brushes 102, slip rings (not identified in FIG. 16) (with brushes being utilized in the case of a DC machine, and slip rings being utilized in the case of an AC machine). The embodiment shown in FIG. 16 is preferred for some applications, particularly in the case of a DC commutated machine.

The transducer of this invention has a significant advantage over a conventional motor by utilization of a minimum amount of iron which undergoes flux reversal. That is, only the iron in the flux carrying elements in the armature is subject to the reversing flux as each pole is passed, and thus low hysteresis losses are experienced. In addition, the effects of flux leakage are reduced so that all of the armature windings experience the total flux change and thus are equally useful at producing torque.

The device of this invention also has significant heat transfer advantages. For this reason, the superior high power to weight ratio is further enhanced. A thin armature is made possible by the armature being made up entirely of insulated conductors except for the necessary volume of the flux carrying members. It is therefore possible to provide cooling to both the inner and outer surfaces of the armature.

By the principles of heat transfer, heat buildup in an armature, with constant surface temperature and uniform internal heating per unit volume, depends on the square of its thickness. For example, compare an armature 0.25 inches thick (as is possible in this invention) to a solid rotor, five inches in diameter (as is common in known devices). The heat buildup in such known devices is some 400 times as great as that of the transducer of this invention with such an armature. Clearly, the electromagnetic transducer of this invention can dissipate more heat than any known conventional transducer of similar power rating.

The electromagnetic transducer of this invention can be produced in several topological variations of the basic design. In addition to the rotating cylindrical shell configuration, by changing the orientation of the magnets and the windings, the motor can be made to produce a linear motion. Other variations (not shown) include pancake and conical configurations.

Figure 17:
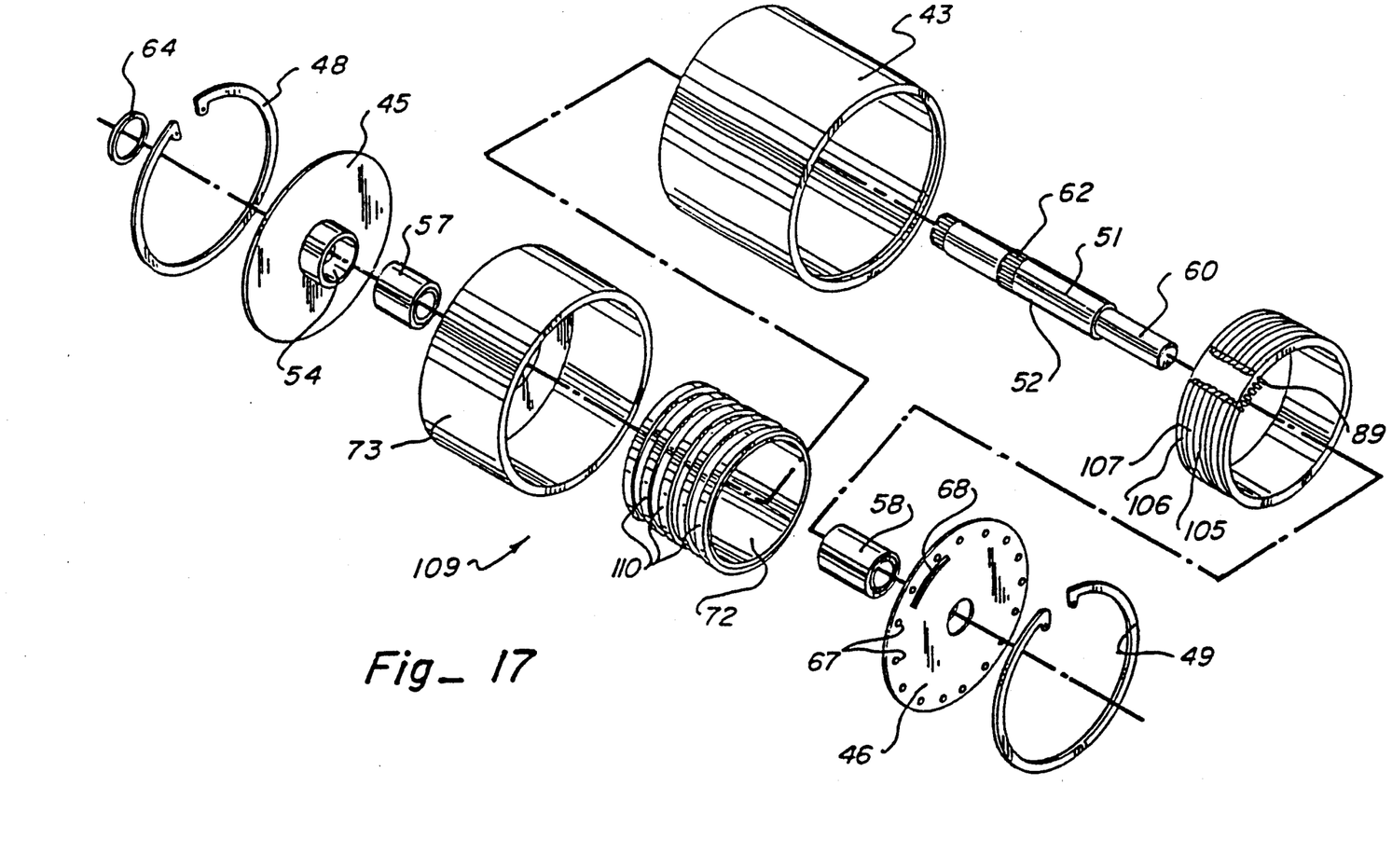
FIG. 17 is an exploded isometric view of another alternate embodiment of the electromagnetic transducer of this invention, and illustrates a cylindrically symmetric linear implementation thereof.

FIG. 17 illustrates a linear reciprocating implementation of the electromagnetic transducer of this invention wherein the magnetic flux producing section moves linearly with respect to the armature in a cylindrical configuration. To accomplish this end, armature 105 has dispersed conductors 106 and flux carrying elements 107 wound radially about shaft 51 (rather than extending parallel thereto as in the embodiment shown in FIG. 1), and rotor 109 has magnets 110 thereon that extend circumferentially around inner cylindrical wall 72 (rather than extending parallel to shaft 51 as in the embodiment shown in FIG. 1).

Figure 18:
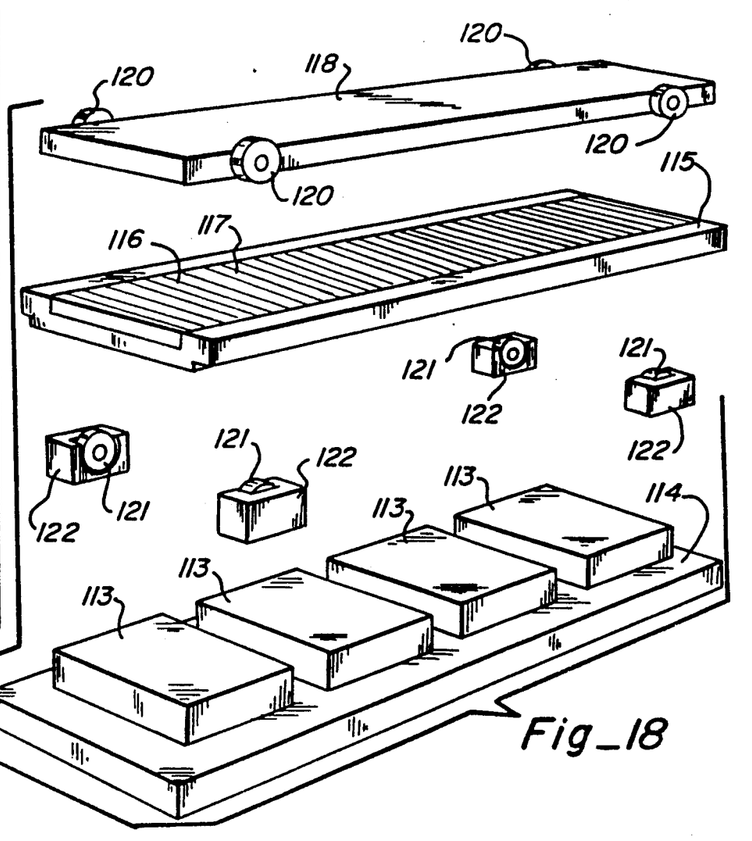
FIG. 18 is an exploded isometric view of still another alternate embodiment of the electromagnetic transducer of this invention, and illustrates a flat linear implementation thereof.

FIG. 18 illustrates another linear reciprocating implementation of the electromagnetic transducer of this invention in which the structure is flat. As shown, magnets 113 are mounted on flat lower return plate 114. Armature 115 is provided with dispersed conductors 116 and flux carrying elements 117 in the same manner as described hereinabove with respect to the other embodiments illustrated except that the armature is essentially flat rather than cylindrical. An upper return plate 118 is also provided, and armature 115 is movable linearly with respect to, and between, lower and upper plates 114 and 118 by means of rollers 120 mounted on the edges of upper plate 118 and rollers 121 mounted in roller mounting boxes 122 (carried by lower plate 114).

The basic configuration and geometry of a prototype transducer constructed according to the principles of this invention and based upon computer calculations are as follows (based upon the use of 24 magnets, conductors 0.008 inches in diameter, and 144 flux carrying elements as brought out more fully hereinafter):

| | |
|---|---|
| Power (at 10,000 rpm) | 40 HP |
| Voltage | 72 volts dc |
| Current | 425 amps dc |
| Diameter | 6.5 inches |
| Armature total thickness | 0.28 inches |
| Length | 3.5 inches |
| Weight | 15.0 lbs. |
| Efficiency (calculated at 10,000 rpm) | 97.6% |

More specifically, the motor calculations as set forth hereinabove are based upon the following motor calculations:

Geometric Parameters
L1 = .125  L2 = .02  L3 = .25  L4 = .02
L5 = .3  L6 = .125  L9 = 2  R1 = 2.488
M1 = .684  M2 = .513  M3 = .171  M5 = .109  M6 = .054
X1 = .5  M4 = .75
Material Properties
R9 = .075  U9 = .0000004  DE = .054  R0 = 1.7241
BR = 11500  UR = 1.05  HD = 5000  RD = .3
WD = .323  RM = .000001  N1 = 2
Winding Variables
DW = 8.000001E-03 or .008  PF = .42  VO = 72  RM = 425  NP = 3
RM = 24  NS = 2  NL = 2  SR = 1  YD = 2
NT = 1  M1 = 2
Magnetic Fields
BA = 8000  BM = 10053  HM = 1378  BS. = 16666
B - Inner RP = 151dl  B - Outer RP = 17136
B - back at 425 amps = 754  Max current at HD = 2042
P(1) = 7.3  P(2) = 1.2  P(3) = .3  P(4) = 3.7
Weights of the Component Parts
Copper = .72  Epoxy = .30  Magnets = 2.22
Stator iron = 1.11  Return paths = 2.32  Housing = 5.87
Shaft = 2.46  Total weight = 15.0
Electrical Parameters
Resistance = .0027  R per phase = .004
No load speed = 11164.7 rpm
Ft-lb at stall (36154 amps) = 1644
Wires/conductor = 56  Effective length = 48
Stat. vol = 7.8  Conductor size is 0.054 by 0.125

Calculated Performance as a Function of Speed
Losses in watts

| rpm | ft-lb | amps | I²R | eddy | hyst's | wind | hp | eff (%) |
|---|---|---|---|---|---|---|---|---|
| 1116 | 19.3 | 425 | 359.6 | 2.5 | 9.3 | .1 | 4.1 | 89.2 |
| 2233 | 19.3 | 425 | 359.6 | 10.2 | 18.6 | .6 | 8.2 | 94 |
| 3349 | 19.3 | 425 | 359.6 | 22.9 | 27.9 | 1.3 | 12.3 | 95.7 |
| 4466 | 19.3 | 425 | 359.6 | 40.7 | 37.2 | 2.6 | 16.4 | 96.5 |
| 5582 | 19.3 | 425 | 359.6 | 63.6 | 46.5 | 4.3 | 20.5 | 97 |
| 6699 | 19.3 | 425 | 359.6 | 91.6 | 55.6 | 6.6 | 24.6 | 97.3 |
| 7815 | 19.3 | 425 | 359.6 | 124.6 | 65.1 | 13.3 | 28.7 | 97.4 |
| 8932 | 19.3 | 425 | 359.6 | 162.8 | 74.4 | 18.6 | 32.9 | 97.6 |
| 10048 | 19.3 | 425 | 359.6 | 206 | 83.7 | 25 | 37 | 97.6 |
| 11033 | 19.3 | 425 | 359.6 | 248.4 | 91.9 | 31.7 | 40.6 | 97.6 |
| 11099 | 9.7 | 213 | 89.9 | 251.3 | 92.5 | 32.2 | 20.4 | 97 | wherein:
Units of length are inches
Fields are in Gauss B, Oersteds H
Losses are in watts
Forces are lb as are weights
P( ) = Gauss-in/Oersted, permeances of the flux paths
R = Resistance, ohms
and wherein:

Parameter   Definition

-continued

| | |
|---|---|
| L1 | inner return path 72 thickness |
| L2 | inner air gap |
| L3 | Armature 82 thickness |
| L4 | Outer air gap |
| L5 | Magnet 80 thickness |
| L6 | Outer return path 73 thickness |
| L9 | Magnet 80 length |
| MI | Option, 1 for magnets inside, 2 for out, 3 for both |
| M1 | magnet pitch |
| M2 | magnet width |
| M3 | gap between magnets at pitch line |
| M4 | M2 as a fraction of M3 |
| M5 | Armature iron pitch |
| M6 | Armature iron width |
| XI | Iron fraction |
| NS | Iron pieces (flux carrying elements) 86 per phase and per pole |
| NT | # of conductors 84 per iron piece 86 |
| NL | # of layers of winding |
| NC | Total # of conductors 84 per phase |
| SR | # of conductors per phase in series |
| NP | # of phases |
| YD | Option, 1 for wye and 2 for delta |
| NW | # of wires per conductor |
| NM | # of magnets 80 |
| PF | wire packing factor |
| DW | wire diameter |
| WD | density of wire material |
| DE | density of epoxy potting material |
| VO | Applied voltage |
| IM | Maximum current |
| | NR is no load speed |
| R1 | Mean armature radius |
| RO | wire resistivity, microohm-cm |

For motor torque verification, the electromagnetic force was measured in an actual test in a linear configuration similar to that illustrated in FIG. 18, built to test computer simulation of a rotary configuration. A current of 125 amps produced a force of 50 lb.

The measured magnetic field (using Type 8 ceramic magnets) was 3500 gauss. The active conductor length spanned three of the four poles and consisted of twenty bars of copper, each $0.150 \times 0.3125$ inches in cross section. Each of the $3 \times 20 = 60$ conductors had an active length of three inches. Thus the total active conductor length was $3 \times 60 = 180$ inches. Using these values, the force was calculated to be 45 lb. The measured force of 50 lb compares well with the calculated force of 45 lb considering the accuracy of the test (for example, the magnetic field is not absolutely uniform everywhere, and fringing field effects were not considered).

Figure 20:
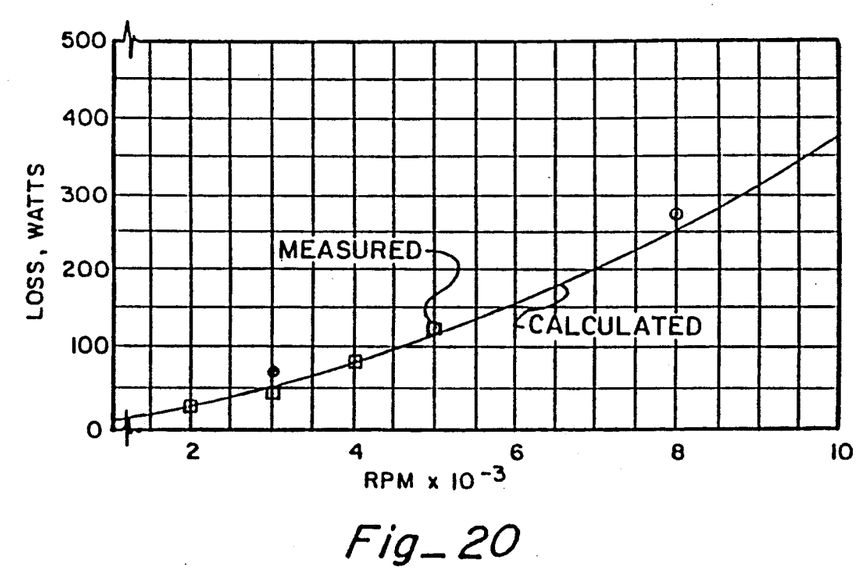
FIG. 20 is a graph illustrating tested eddy current, hysteresis and windage losses at different speeds of one example of the transducer of this invention.

Measured eddy current, hysteresis and windage losses for a transducer constructed according to the principles and description herein are shown in the graph of FIG. 20. This motor delivered 16 horsepower at 7800 RPM in preliminary testing.

As can be appreciated from the foregoing, the electromagnetic transducer of this invention is thus able to provide an output power to weight ratio that is greater than one horsepower to one pound in a cooling gas medium (using air as the cooling medium), and is believed to be greater than five horsepower to one pound in at least some cooling mediums (with a five to one ratio being calculated for the prototype motor as set forth herein). It should be further appreciated from the foregoing that this invention provides an improved electromagnetic transducer that is lightweight, compact, efficient and yet capable of delivering high power.

What is claimed is:

1. An electromagnetic transducer, comprising:

(a) magnetic flux producing means of high energy permanent magnets for producing a magnetic flux;

(b) an armature means for intercepting said magnetic flux, said armature means including conductor means having a plurality of discrete active regions for carrying electrical current and which are spaced apart and have a substantially rectangular cross-section to provide a plurality of discrete elongated open space areas between said active regions, said active regions comprising a plurality of parallel conductive wires insulated from one another, said conductive wires having a diameter on the order of 0.008", magnetic flux carrying means comprising a multiplicity of discrete flux carrying members formed of non-sintered highly compressed iron powder particles interposed between said active regions of said conductor means, said flux carrying members containing a bonding agent to hold together said flux carrying means and a bonding agent to bond said flux carrying means and said conductor means;

(c) a movable member having one of said magnetic flux producing means and said armature means secured thereto; and (d) means for mounting another of said magnetic flux producing means and said armature means to allow said movable member to move relative thereto, whereby said magnetic flux producing means and said armature means are able to move relative to one another.

2. A high-speed, high torque electromagnetic transducer comprising:

a housing;

a shaft mounted on said housing to rotate relative thereto;

a magnetic field generating rotor secured to said shaft to rotate therewith, said rotor having a mounting disk connected to said shaft and one of a first annular wall means having a cylindrical first magnetic means mounted thereon for generating a magnetic flux and a second annular wall means comprising an outer annular wall and an inner annular wall; both said inner and outer annular walls being supported by said mounting disk and spaced radially apart to define an annular gap therebetween, said inner annular wall being spaced radially apart from said shaft, and a second means for generating a magnetic flux mounted on at least one of said inner and outer annular walls;

an armature for intercepting and dispersing a phase of said magnetic flux, said armature fixed to said housing, said armature comprising an annular winding structure comprising winding conductors and having a generally cylindrical shape with two flat ends at which the winding conductors are reversed in direction, an active area between said flat ends; a plurality of circumferentially spaced discrete elongated openings in said active area; a plurality of discrete elongated dispersed phase magnetic flux carrying members pressed powdered iron particles inserted into said elongated openings so as to act as dispersed phase magnetic flux carrying means; said dispersed phase magnetic flux carrying members radially inner and radially outer elongated edges; a bonding agent surrounding said winding structure and said dispersed phase magnetic flux carrying members; and means for mounting said armature to allow said rotor to move relative thereto, whereby said rotor and said armature are rotated relative to each other and to said housing to provide high power output.

3. An electromagnetic transducer, comprising:
(a) magnetic flux producing said means for producing said magnetic flux;
(b) an armature means for intercepting said magnetic flux, said armature means including conductor means having a plurality of discrete active regions for carrying electrical current which are spaced apart and have a substantially rectangular cross-section to provide a plurality of discrete elongated open space areas between said active regions,
said active regions comprising a plurality of parallel conductive wires insulated from one another,
magnetic flux carrying means comprising a multiplicity of discrete flux carrying members formed of compressed fine iron powder particles of diameter generally from 10–100 microns, said particles being reactively coated with phosphate insulation,
said flux carrying members being interposed between said active regions of said conductor means, and a bonding agent comprising wax to hold together said flux carrying means and said conductor means;
(c) a movable member having one of said magnetic flux producing means and said armature means secured thereto; and
(d) means for mounting the other of said magnetic flux producing means and said armature means to allow said movable member to move relative thereto, whereby said magnetic flux producing means and said armature means are able to move relative to one another.

4. An electromagnetic transducer, comprising:
(a) magnetic flux producing means of high energy permanent magnets for producing a magnetic flux;
(b) an armature means for intercepting said magnetic flux, said armature means including conductor means having a plurality of discrete active regions for carrying electrical current and which are spaced apart and have a substantially rectangular cross-section to provide a plurality of discrete elongated open space areas between said active regions,
said active regions comprising a plurality of parallel conductive wires insulated from one another,
magnetic flux carrying means comprising a multiplicity of discrete flux carrying members formed of non-sintered highly compressed iron powder particles interposed between said active regions of said conductor means,
said flux carrying members containing a bonding agent to hold together said fluxing carrying means and a bonding agent to bond said flux carrying means, said compressed iron powder particles being 10–100 microns in diameter, and said bonding agent comprising epoxy;
(c) a movable member having one of said magnetic flux producing means and said armature means secured thereto; and
(d) means for mounting another of said magnetic flux producing means and said armature means to allow said movable member to move relative thereto, whereby said magnetic flux producing means and said armature means are able to move relative to one another.

5. A high-speed, high torque electromagnetic transducer comprising:
a housing;
a shaft mounted on said housing to rotate relative thereto;
a magnetic field generating rotor secured to said shaft to rotate therewith, said rotor having a mounting disk connected to said shaft and one of a first annular wall means having a cylindrical first magnetic means mounted thereon for generating a magnetic flux and a second annular wall means comprising an outer annular wall and an inner annular wall; both said inner and outer annular walls being supported by said mounting disk and spaced radially apart to define an annular gap therebetween, said inner annular wall being spaced radially apart from said shaft, and a second magnetic means for generating a magnetic flux mounted on at least one of said inner and outer annular walls;
an armature for intercepting and dispersing a phase of said magnetic flux, said armature fixed to said housing, said armature comprising an annular winding structure comprising winding conductors and having a generally cylindrical shape with two flat ends at which the winding conductors are reversed in direction, an active area between said flat ends; a plurality of circumferentially spaced discrete elongated openings in said active area; a bonding agent surrounding said winding structure; and
means for mounting said armature to allow said rotor to move relative thereto, whereby said rotor and said armature are rotated relative to each other and to said housing to provide high power output.

* * * * *